United States Patent
Tzolov et al.

(10) Patent No.: US 10,200,893 B2
(45) Date of Patent: Feb. 5, 2019

(54) SYSTEMS AND METHODS FOR PROVIDING VISUALIZATION OF A TELECOMMUNICATIONS NETWORK TOPOLOGY

(71) Applicant: CENX, Inc., Ottawa (CA)

(72) Inventors: Peyo Tzolov, Ottawa (CA); Thomas Goldsmith, Ottawa (CA); Achint Sandhu, Ottawa (CA)

(73) Assignee: CENX, INC., Ottawa (CA)

( * ) Notice: Subject to any disclaimer, the term of this patent is extended or adjusted under 35 U.S.C. 154(b) by 969 days.

(21) Appl. No.: 14/630,404

(22) Filed: Feb. 24, 2015

(65) Prior Publication Data
US 2016/0249240 A1 Aug. 25, 2016

(51) Int. Cl.
*H04W 24/08* (2009.01)
*G06F 17/30* (2006.01)
*H04L 12/24* (2006.01)
*H04W 16/18* (2009.01)

(52) U.S. Cl.
CPC ...... *H04W 24/08* (2013.01); *G06F 17/30979* (2013.01); *H04L 41/12* (2013.01); *H04L 41/22* (2013.01); *H04W 16/18* (2013.01)

(58) Field of Classification Search
CPC ....... H04L 41/22; H04L 41/12; G06F 15/173; G06F 15/17362; G06F 15/17368
See application file for complete search history.

(56) References Cited

U.S. PATENT DOCUMENTS

| | | | |
|---|---|---|---|
| 6,054,987 A | 4/2000 | Richardson | |
| 6,259,451 B1 * | 7/2001 | Tesler | G06T 11/206 345/419 |
| 8,032,621 B1 * | 10/2011 | Upalekar | G05B 23/0275 370/241 |
| 8,812,542 B1 * | 8/2014 | Saring | G06F 17/302 707/770 |
| 2003/0097438 A1 | 5/2003 | Bearden et al. | |

(Continued)

OTHER PUBLICATIONS

Dwyer et al., "Dunnart: A Constraint-based Network Diagram Authoring Tool," Clayton School of Information Technology, Monash University, Australia; pp. 1-12, (2009).

(Continued)

*Primary Examiner* — Doon Y Chow
*Assistant Examiner* — Le V Nguyen
(74) *Attorney, Agent, or Firm* — Sterne, Kessler, Goldstein & Fox P.L.L.C.

(57) ABSTRACT

Systems and methods are disclosed for providing visualization of a telecommunications network topology. In an embodiment, a request is sent for data matching a search query. A response is then received at a client device that includes a data object containing a plurality of data fields and corresponding field values. These data fields and corresponding field values collectively define a plurality of communications paths in the telecommunications network. Each path describes the topological structure of network objects in the path of communication between two network objects. The received data object is then processed at the client device to generate a visual representation of each path defined in the data object. Finally, the generated visual representations are displayed at the client device in an interactive, graphical user interface.

23 Claims, 8 Drawing Sheets

(56) References Cited

U.S. PATENT DOCUMENTS

| | | | |
|---|---|---|---|
| 2004/0215764 A1 | 10/2004 | Allen et al. | |
| 2006/0282575 A1* | 12/2006 | Schultz | G06F 3/04883 710/62 |
| 2012/0117145 A1* | 5/2012 | Clift | G06F 9/4445 709/203 |
| 2012/0151362 A1* | 6/2012 | Narayanan | H04L 41/0893 715/736 |
| 2015/0074260 A1 | 3/2015 | Anand et al. | |

OTHER PUBLICATIONS

Withall et al., "Nework Visualization: A Review," IET Communications, 1 (3), 2007; pp. 365-372, (Jun. 2007).

Becket et al., "Visualizing Network Data," IEEE Transactions on Visualization and Computer Graphics, vol. 1, No. 1, Mar. 1995; pp. 16-21, (Mar. 1995).

Loubier et al., "Visualization and Analysis of Large Graphs," 6 pages, (Nov. 2007).

Schultz, et al., "Visualizing Graphs—A Generalized View," Department of Computer Science, University of Rostock, Germany, 8 pages, (Jul. 24, 2006).

Liu, et al., "A Survey on Information Visualization: Recent Advances and Challenges," The Visual Computer 30, No. 12, 2014; pp. 1373-1393, (Dec. 2014).

* cited by examiner

SYSTEMS AND METHODS FOR PROVIDING VISUALIZATION OF A TELECOMMUNICATIONS NETWORK TOPOLOGY

BACKGROUND

Field

This field is generally related to the visualization of a telecommunications network topology, and more specifically to providing visualizations of communications paths within a telecommunications network.

Background

Modern communications carriers operate local, regional, and nationwide networks to provide connectivity to customers. These networks are built with a variety of equipment to perform various tasks, and such equipment may be manufactured by multiple vendors. Each piece of equipment may be complex enough to handle hundreds or thousands of simultaneous connections, and different pieces of equipment may be widely dispersed across a region. Wireless base stations, for example, are geographically distributed across a city to optimize coverage and efficiency. Customer expectations of network availability, given such distribution, complexity, and heterogeneity of equipment, mandates fast detection and accurate diagnosis of network issues that may arise.

To address network issues and ensure availability, network operators must be able to monitor elements and resources within the network. Many systems that serve this purpose typically rely on an inventory database of record to maintain updated information about objects within the network. This information is often entered manually in order to remain up-to-date, and errors due to manual entry may be difficult to find.

Client devices that may display visualizations of data from the inventory database of record typically communicate with a separate server coupled to the inventory database. Processing of inventory data and generation of objects for display commonly occur at the server, requiring significant processing power and large amounts of data to be exchanged between the server and the client device. Furthermore, a user interface on the client device may need to be refreshed manually to ensure the displayed visualizations are up-to-date, placing an additional burden on a user and temporarily blocking interaction with the interface. A solution is needed that reduces load on the system, while improving the usability of the user interface and ensuring the accuracy of visualizations and associated data displayed.

BRIEF SUMMARY

Systems and methods are disclosed for providing visualization of a telecommunications network topology. In an embodiment, a request is sent for data matching a search query. A response is then received at a client device that includes a data object containing a plurality of data fields and corresponding field values. These data fields and corresponding field values collectively define a plurality of communications paths in the telecommunications network. Each path describes the topological structure of network objects in the path of communication between two network objects. The received data object is then processed at the client device to generate a visual representation of each path defined in the data object. Finally, the generated visual representations are displayed at the client device in an interactive, graphical user interface.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Overview

To ensure reliability and availability of a telecommunications network, network objects and resources must be closely monitored, and issues must be quickly diagnosed and corrected. A network operator may operate an interactive, graphical user interface on a client device to view and analyze data related to network objects in the network. The data may be stored in a separate inventory database of record. The inventory database may require data to be entered manually or specially formatted, and a single piece of data may contain only a single source.

In many systems, processing of inventory data and generation of objects for display in the user interface typically occur on a separate server coupled to the inventory database of record. Data exchanged between the server and the client device may include not only inventory data, but also information regarding how to display each generated object in the user interface. This adds a significant amount of data that must be transmitted to the client device, increasing request-response times in the system. Furthermore, generation of objects for display, particularly graphical components, requires substantial processing power, increasing server load. This may be compensated for by adding or upgrading server hardware to scale vertically, which may come at significant expense.

Embodiments of the present invention address these issues by providing an adaptive user interface that enables a client device to request and receive data from a plurality of services. Each service may reside on the client device or a separate server. The generation and rendering of objects for display occur on the client device, reducing server-side processing load. This allows for efficient and inexpensive horizontal scaling, as each client device adds additional hardware.

In various embodiments, the user interface displays visual representations of the topological structure of the telecommunications network. This allows a user to analyze network faults in the context of affected communications paths, sites, regions, and other network objects. Visual representations may be generated at the client device, requiring only minimal data (e.g., standard text formatted data) to be exchanged between the client device and the plurality of services.

Data accuracy issues may be addressed by displaying information corroborated by multiple sources, and providing an indication of the probable accuracy of the data within the user interface. In this manner, data corroborated by multiple sources may filter out manual entry errors caused by a single data source.

In many systems, problems may also arise with respect to displaying up-to-date information, as it is difficult to know whether a data refresh is required. Additionally, a data refresh may block interaction with the user interface and may take significant time, decreasing user productivity. In an embodiment, up-to-date information may be maintained by establishing a persistent, bidirectional connection between the client device and a service. This enables the service to provide real-time updates to the client device, which can be processed asynchronously without blocking interaction with the user interface. In an embodiment, the client device may also issue asynchronous, non-blocking requests in response to user input.

Embodiments of the present invention also provide an adaptive search feature that allows a user to intelligently refine search queries and quickly find relevant results. Finally, many systems require a user to populate complicated or lengthy search forms when searching for network information. When search results are received, a user may be required to examine thousands of results or repopulate the search form differently, greatly decreasing productivity. Embodiments of the present invention provide suggested query options based on user input to efficiently narrow search results. The suggested query options may be updated in real-time when further input is received, without blocking operation of the user interface.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Method

Figure 1:
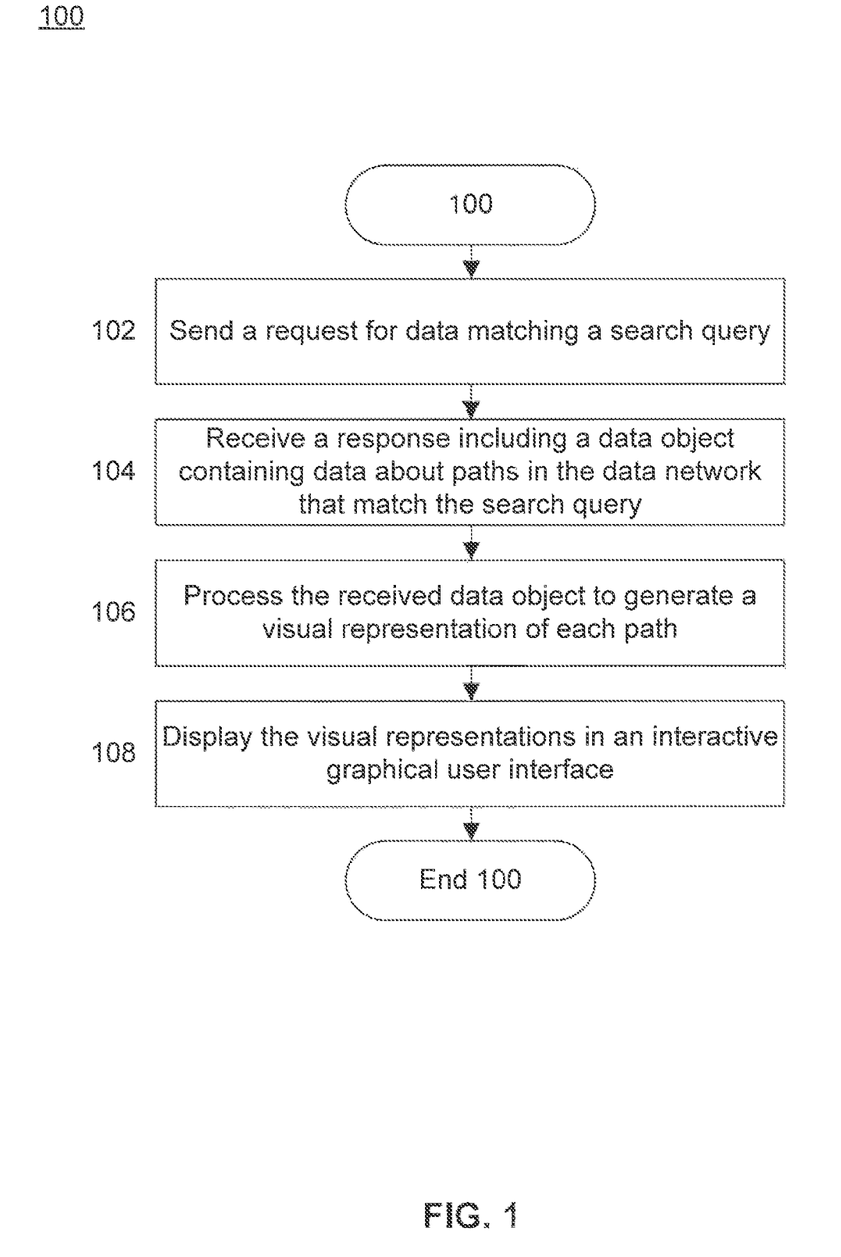
FIG. 1 is a flowchart illustrating an example method for providing visualization of a telecommunications network topology, according to an embodiment.

FIG. 1 is a flowchart illustrating an example method for providing visualization of a telecommunications network topology, according to an embodiment. Method 100 begins at step 102 when a request for data matching a search query is sent from a client device. In an embodiment, the request may be generated in response to input from a user operating the client device. The client device may be any type of computing system as described with respect to FIG. 8, such as and without limitation, a PC, laptop, or mobile device.

The search query may broadly or specifically target network objects in the telecommunications network. For example, the search query may target data related to a specific cell site aggregation router in an Ethernet transport network, or the search query may target all network objects in a particular geographic region of the network.

The request may be transmitted to a service via a network, such as the Internet. In one example, the search query may be transmitted as a parameter or parameters of a hypertext transfer protocol (HTTP) request to the service. In embodiments, the service resides on a device separate from the client device and exposes an application programming interface (API) that is accessible by the client device. The request may be transmitted to the service via a call to the service API.

At step 104, a response may be received at the client device from the service that includes a data object. In an embodiment, the data object includes a plurality of data fields and corresponding field values that can be processed and manipulated by the client device. For example, the data object may be structured using a standard text format, such as JSON or XML, that can be manipulated by application code executing on the client device.

In an embodiment, the data fields and corresponding field values in the data object collectively define a plurality of communications paths in the network matching the search query. Each path describes the topological structure of network objects in the path of communication between two network objects. In this manner, each path describes the flow of data from one network object to another. In an embodiment, the data fields in the data object that define a communications path are complete in the sense that the topological structure of a path between any two network objects can be defined using these data fields.

At step 106, the received data object is processed at the client device to generate a visual representation for each path defined therein. In an embodiment, an application running on the client device contains logic that enables the application to extract relevant information for each path. For example, an application running in a browser contained within the client device may execute JavaScript code designed to manipulate the received data object. The executed code may generate a visual representation for each path based on the extracted information.

At step 108, the generated visual representations are rendered and displayed at the client device in an interactive, graphical user interface. As in the previous example, JavaScript code executing in a browser application may perform operations to render and display the visual representations in the interactive user interface.

In an embodiment, the definition of a communications path within the data object is structured hierarchically. At the top level, general information about the path may be provided, such as but not limited to, an identifier, name, type, status, and aliases for the path, as well as any existing path identifiers from external systems. A plurality of network objects that exist within the path are also defined. Network sites and segments may first be defined at the broadest level, and each site or segment may contain a plurality of more granular network objects. For example, a path connecting a cell site and an aggregation site in a telecommunications network may first define the cell site, the aggregation site, and at least one segment connecting the two objects. Each of these network object definitions may contain fields describing general information (e.g., identifiers, names, locations, classifications, etc.), left and right endpoints, and nested network objects. This hierarchical structure of network objects may be used to determine a path topology for use in generating a visual representation of the path.

The left and right endpoints define objects that are connected directly to a network site or segment, as well as provide orientation for the visual representation of the path. For example, the right endpoint of a cell site may specify a particular segment, the left endpoint of an aggregation site may specify the same segment, and left and right endpoints of the segment may specify the cell site and the aggregation site, respectively. This may allow the client device to generate a horizontal visual representation of the path showing the described connections. In an embodiment, network sites and segments may include several endpoints that enable a visual representation of a path to be directionally oriented in any desired manner, such as but not limited to, horizontally, vertically, or diagonally.

Each network site or segment may include a plurality of network objects, such as but not limited to, network routers, interfaces, tunnels, and Ethernet lines. Each of these object definitions may include fields that specify an object identifier, type, status, and further nested network objects. The type and status may be used in generating a visual representation the network object. For example, the visualization logic on the client device may associate each type with a particular graphic representation, and the style of the graphic representation may be influenced by the current status.

As described in method 100, all rendering and processing of communications paths occur at the client device. This minimizes the amount of data that needs to be transmitted between the service and the client device, requiring only standard text formatted objects, such as JSON- or XML-formatted objects, to be transmitted from the service to the client device. This facilitates efficient horizontal scaling, as each client adds additional processing and rendering hardware. This also allows for real-time or near real-time features, which add significant processing requirements, to be incorporated into the user interface without the need to scale vertically. In this manner, the interactive user interface may be updated automatically to reflect changes in the network as they occur, for example, when a fault is detected, which will be discussed in the sections that follow.

Figure 2:
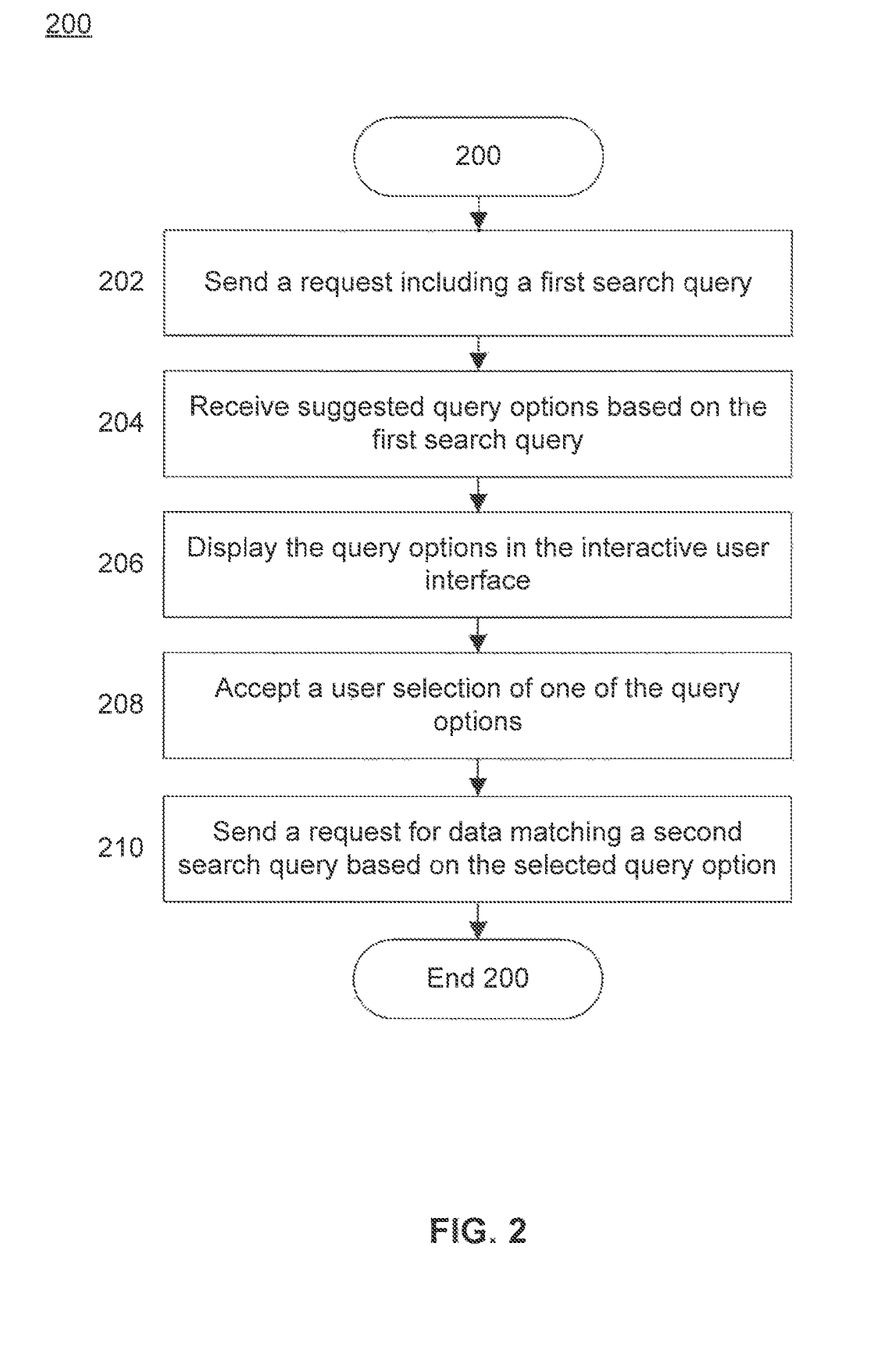
FIG. 2 is a flowchart illustrating an example method for receiving and displaying suggested search options based on an initial search query, according to an embodiment.

FIG. 2 is a flowchart illustrating an example method for receiving and displaying suggested search options based on an initial search query, according to an embodiment. Method 200 begins at step 202 when a request that includes a first search query is sent from a client device to a search service. In an embodiment, an HTTP request may be sent from the client device to the search service via a network, such as the Internet.

In turn, at step 204, a response is received from the search service including suggested query options based on the first search query. The suggested query options may allow a user to refine the search by targeting specific network objects in the network. For example, the suggested query options may include particular network sites, network elements, communications paths, service providers, or geographic regions that match the search query. The suggested query options may be organized by category for improved usability.

At step 206, the suggested query options are displayed in the interactive user interface. At step 208, one of the suggested query options is selected in response to user input, and a second search query is constructed based on the selected query option. At step 210, an additional request is sent to the search service for data matching the second search query.

In an embodiment, the first search query may be a sequence of characters input by a user. The search functionality may be adaptive by providing updated suggested query options in response to each input character. In an embodiment, a new non-blocking, asynchronous request, such as an asynchronous HTTP request, may be sent for each character input by the user. For each request sent, a response may be received including a new set of suggested query options. When a response to a new request is received, the suggested query options displayed in the interactive user interface may be automatically updated to reflect the new set of suggested options. This allows the suggested query options to be refined as input is received, and further allows the user to receive real-time feedback on the input search query without temporarily blocking interaction with the application, which may provide significant improvements in efficiency when searching through thousands of network objects.

Interactive User Interface

Figure 3:
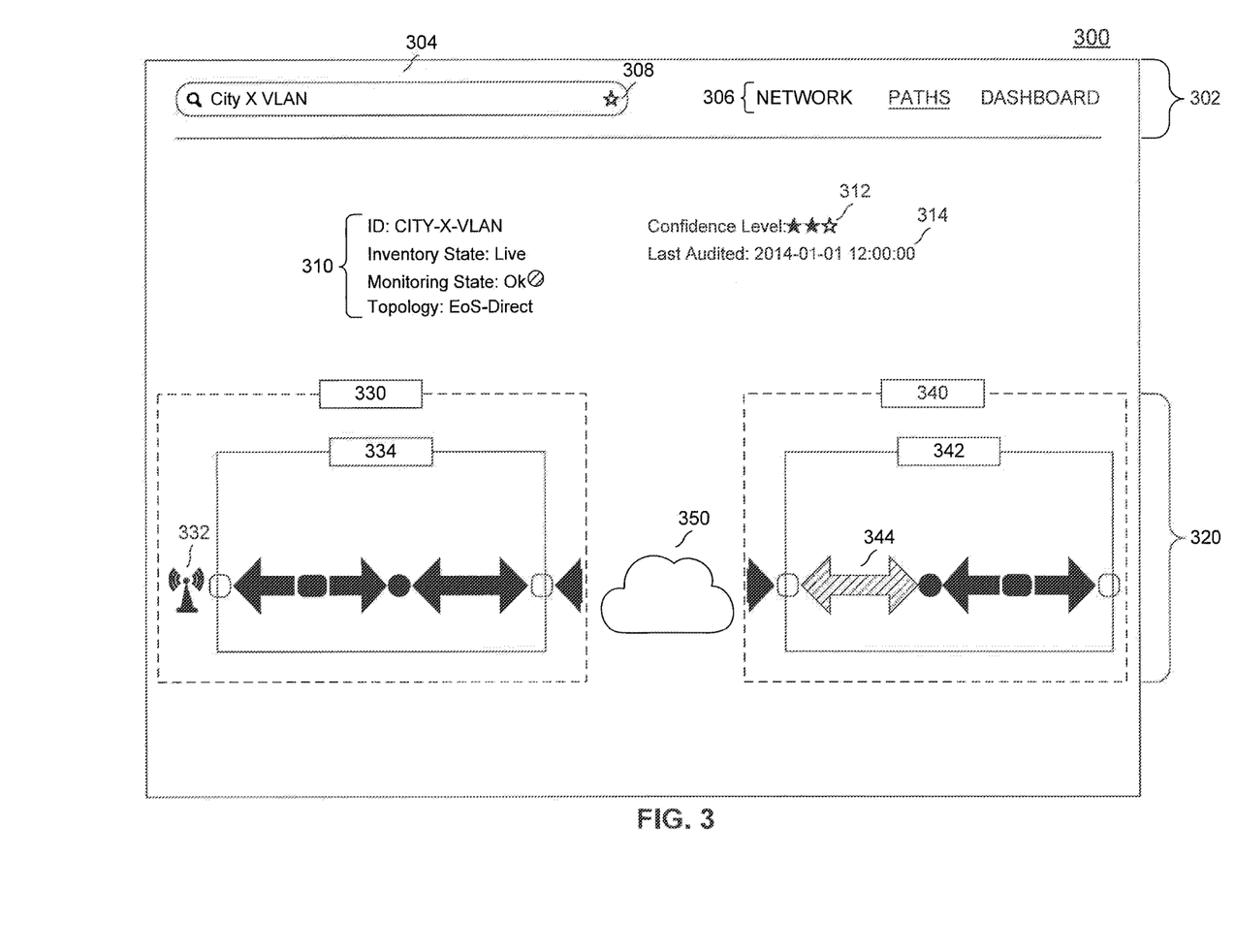
FIG. 3 is an example interface that presents visual representations of communications paths in a telecommunications network, according to an embodiment.

FIG. 3 is an example interface that presents visual representations of communications paths in a telecommunications network, according to an embodiment. The example user interface depicted in FIG. 3 may appear, for example, in a web application inside a browser at a client device.

Pane 302 contains search box 304 and navigation items 306 for selecting different features of the user interface. Search box 304 may receive a search query as input from a user in the form of a sequence of characters. In various embodiments, search box 304 may enable requests for data matching the search query to be sent to an external service, as described with respect to FIGS. 1 and 2. Search queries may also be saved for future use and recalled at a later time. For example, favorites button 308 may be clicked to save the current search query displayed in search box 304. In an embodiment, all search queries performed by a user may be recalled and repeated at a later time.

The example interface illustrated in FIG. 3 presents data related to a single communications path that matches the search query displayed in search box 304. Data 310 presents general information about the displayed path, such as identifying and status information. For example, information regarding the monitoring state indicates whether any errors or warnings exist within the path. A generated visual representation of the communications path, as described with respect to FIG. 1, is rendered and displayed in pane 320. A confidence level 312 for the path may also be displayed in the user interface. In an embodiment, a data object received at the client device, as described with respect to FIG. 1, may include a confidence level for each communications path defined therein.

In an embodiment, the confidence level for each path may be determined by a separate audit service. The confidence level may denote the probable accuracy of the generated visual representation of the path. For example, if the audit service discovers conflicting information or a lack of information regarding a network object in the displayed path, a lower confidence level may be assigned to that network object. The overall confidence level for the path may then be computed by aggregating individual confidence levels for network objects in the displayed path. Other methods for computing the confidence level for the path may also be known to one skilled in the art and used in various embodiments. A displayed timestamp 314 indicates the time and date that the confidence level was last updated. In an embodiment, confidence level 312 and timestamp 314 may be automatically updated as events are received at the client device.

A visual representation of the communications path is displayed in pane 320. The example depicted in FIG. 3 shows an example path from a network cell site 330 containing a cell site router 332 to a network aggregation site 340. Sites 330 and 340 may contain a plurality of network objects shown in groups 334 and 342, respectively, such as but not limited to, network interfaces, sub-interfaces, and Ethernet lines. In an embodiment, further information about each network object may be revealed in response to user input, such as hovering over an object.

A generic visual 350 may denote that a visual representation of a portion of the communications path could not be generated. This may be due to a lack of available information or conflicting information regarding that portion of the path. Depending on the amount and accuracy of information available, different visuals may be incorporated into the overall visual representation of the path.

In an embodiment, when a visual representation of a communications path is generated, as described with respect to FIG. 1, the client device may first determine whether sufficient information is available to generate a visual representation of each network object in the path. For example, a browser application may execute JavaScript code that contains logic to determine whether sufficient information concerning each network object has been received. In the event that sufficient information is available for a network object, a visual representation of the network object may be generated as part of the overall visual representation of the path. In the event that sufficient information is not available for at least one network object in the path, one or more generic visuals may be generated and incorporated as part of the overall visual representation of the path.

In an embodiment, in the event that sufficient information is not available for at least one network object in the path, insufficiency details may be displayed in the user interface together with the visual representation of the path. These insufficiency details may indicate reasons that a visual representation of a portion of the path could not be generated. For example, insufficient data may be available for a portion of the path connecting network site 330 to network site 340. This may be denoted by generic visual 350. In this example, the missing portion denoted by visual 350 may be leased from another service provider, and information related to network objects in that portion of the path may not be accessible to the current user. These details may be useful in pinpointing issues in the network. As in the previous example, if an issue exists in the path, but no issues are detected in the visualized portions of the path, a user may be able to quickly infer and notify the service provider that a problem may exist within the portion of the path connecting network site 330 to network site 340.

The visual representation displayed in pane 320 may also display existing faults in the network. For example, a network fault associated with network object 344 is depicted in the visual representation of the path. In various embodiments, this may be indicated by various style changes in the visual representation of a path, such as but not limited to, displaying different background or border colors. In an embodiment, further details of a network fault can be displayed in response to user input, such as but not limited to, clicking on an affected object.

A data object received at the client device, as described with respect to FIG. 1, may include information related to existing network faults. In an embodiment, the client device may identify these network faults and incorporate the information into the generated visual representations of affected paths. The identified network fault information may also include a severity level assigned to each fault. For example, a lower severity level may indicate that the fault in not critical and may be corrected at a later time. Alternatively, a higher severity level may indicate that the fault is critical and requires immediate attention. The severity level may also be incorporated into the visual representation of affected paths or displayed together with the visual representation in the user interface.

In another embodiment, the client device may be notified of network faults via a network fault monitoring service. This service may provide real-time fault information to the client device, enabling a user to always view up-to-date status information for network objects in a communications path. In an embodiment, the client device may establish a persistent, bidirectional connection, such as a WebSocket connection, to the network fault monitoring service. This connection enables the client device to receive notifications of network faults and corrections as they occur. When a notification is received by the client device, the visual representations of displayed paths may be automatically regenerated and updated on the user interface based on the received notification. For example, visual representations of paths displayed in a browser application may be updated asynchronously without interfering with the operation of the user interface, and without additional user input.

Figure 4:
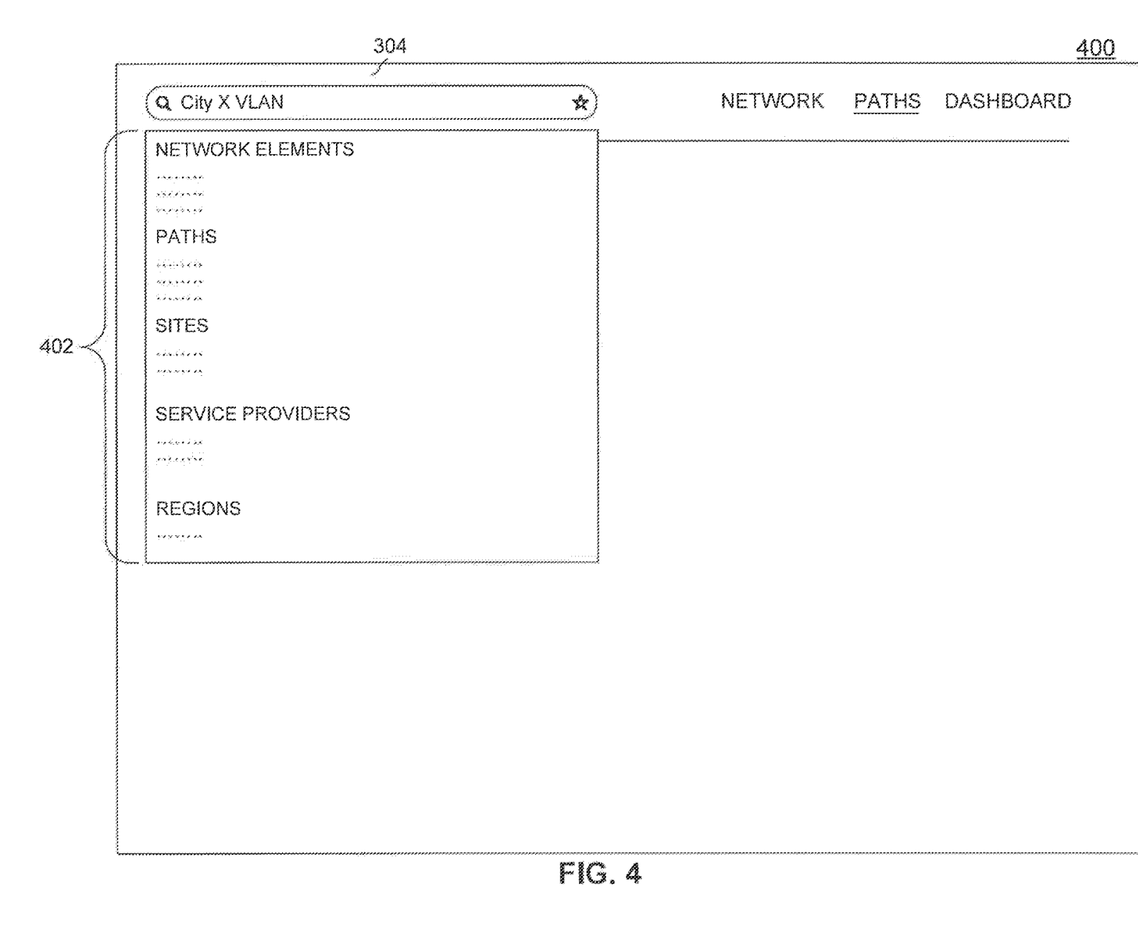
FIG. 4 is an example interface that displays suggested search options based on an initial search query, according to an embodiment.

FIG. 4 is an example interface that displays suggested search options based on an initial search query, according to an embodiment. As depicted in the example interface, search box 304 may accept input from a user in the form of a sequence of characters. As described with respect to FIGS. 1 and 2, a new asynchronous request may be sent to a search service for each character input by the user. In turn, a response may be received from the search service including suggested query options, which are then displayed drop-down list 402. In an embodiment, the suggested query options may be organized by category, as depicted in drop-down list 402. The categories and organization may vary in different embodiments.

For each response received from the search service for each successive request, the list of suggested query options in drop-down list 402 may be automatically updated according to the response. This adaptive feature allows a user interacting with the user interface to receive more relevant suggestions as the query string is refined. The adaptive search features, as previously described, also reduce the search time required to view desired communications paths and network objects. The user may be able to receive almost instant feedback when interacting with the search box, making it possible to quickly narrow down search results without having to examine thousands of paths and network objects or populate a lengthy search form.

Figure 5:
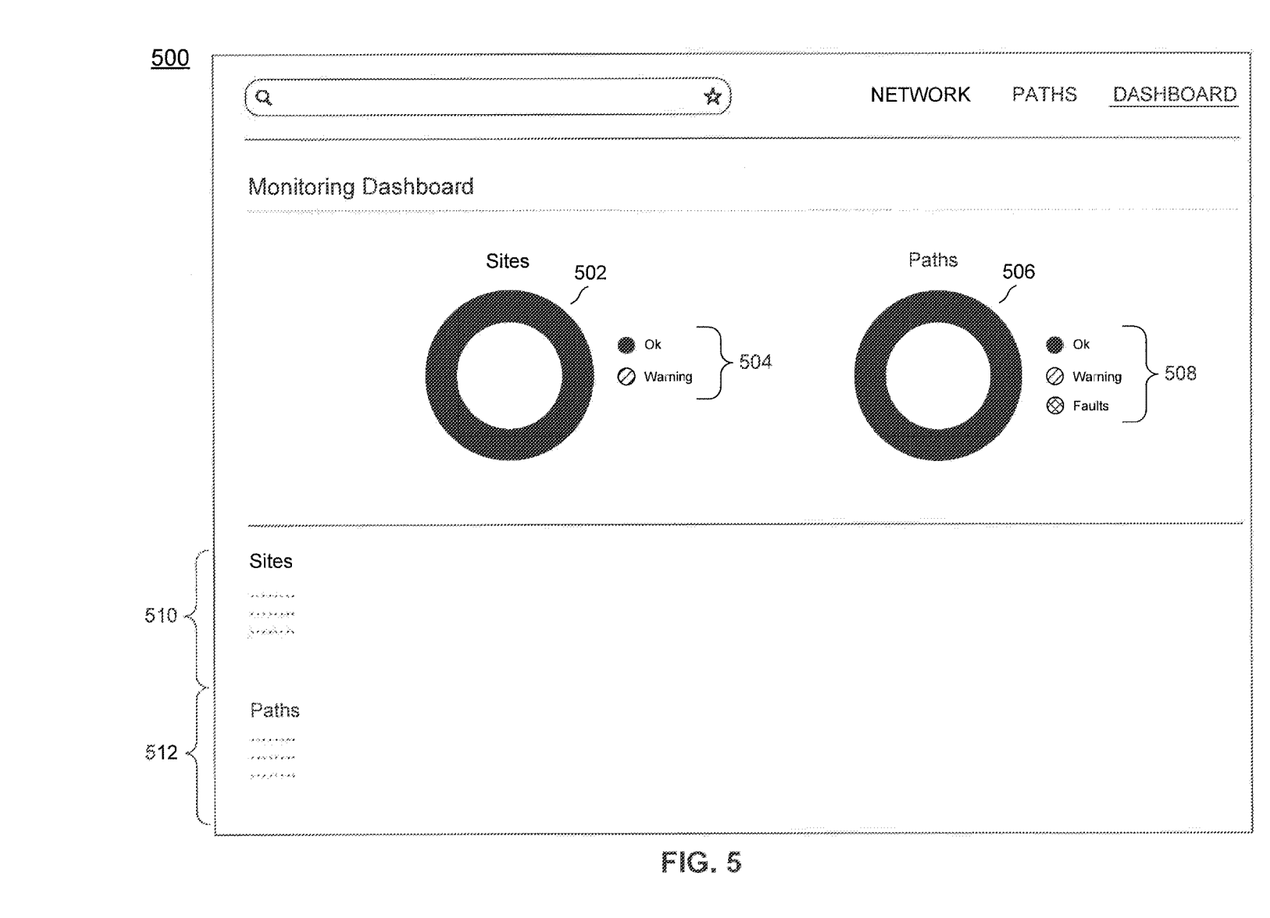
FIG. 5 is an example interface that presents status information for a plurality of network objects in a telecommunications network, according to an embodiment.

FIG. 5 is an example interface that presents status information for a plurality of network objects in a telecommunications network, according to an embodiment. This interface provides a user with a concise overview of network conditions and allows the user to quickly view more detail when desired. Status information may be received periodically at the client device from one or more services. In an embodiment, requests for status information may be generated in response to user interaction. In another embodiment, the client device may establish a persistent connection with one or more services to automatically receive status updates for a plurality of network objects.

The received status information may include information related to existing network faults. The status information may then be aggregated and displayed in the interactive user interface. In an embodiment, the status information for network objects may be aggregated by network site and by path, as shown in graphs 502 and 506. The legends 504 and 508 of each graph display aggregated status statistics, including the number of sites and paths without issue, and the number of sites and paths containing at least one fault.

Based on the received status information, a list of existing network faults may also be created. In an embodiment, the existing faults are displayed in lists 510 and 512. List 510 displays network sites containing at least one fault, and list 512 displays communications paths containing at least one fault. In other embodiments, all existing faults may be combined into a single list, or more lists may be displayed, for example all network objects containing at least one fault. Each listed fault may contain a link to display more detailed information or view a generated visual representation of the affected network site or communications path.

Figure 6:
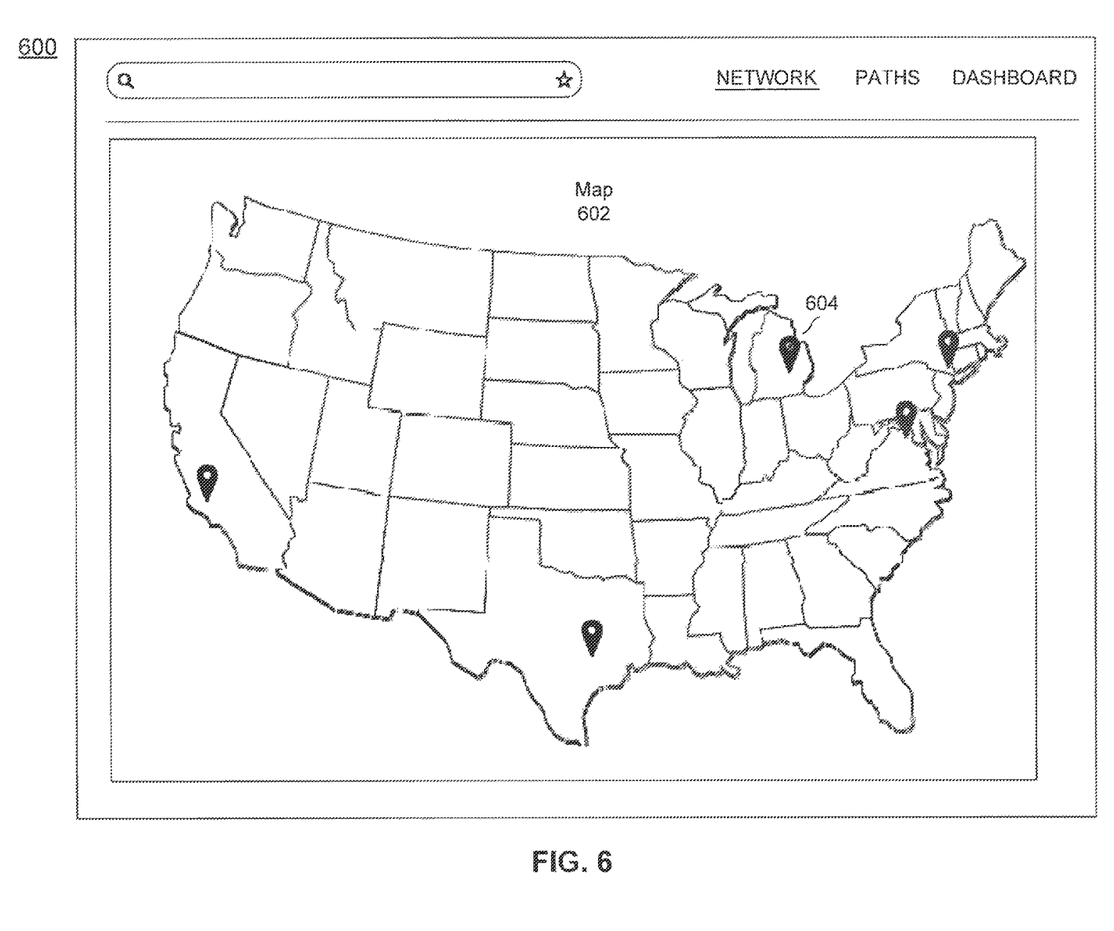
FIG. 6 is an example interface that presents a plurality of network objects in a telecommunications network arranged geographically on an interactive map, according to an embodiment.

FIG. 6 is an example interface that presents a plurality of network objects in a telecommunications network arranged geographically on an interactive map, according to an embodiment. Map 602 displays network objects 604 based on a selected geographic boundaries and a zoom level associated with map 602. In an embodiment, as the zoom level increases, more granular network objects may be displayed on map 602. For example, if three U.S. states are visible on map 602, only large network sites may be displayed. Alternatively, if the geographic boundaries of the map only span a single network site, more granular network objects such as cell site routers and microwave radios may be displayed. In an embodiment, for each network object 604 displayed on map 602, more detailed information may be revealed in response to user input, such as but not limited to, clicking on a network object 604.

When map 602 is panned or zoomed, a request may be sent for data related to network objects within the new geographic boundaries of the displayed map. The request may be sent asynchronously, so as not to interfere with the operation of the interactive user interface. A response may be received that contains a data object including location information for network objects located within the geographic boundaries of map 602. Network objects 604 may then be plotted and displayed on map 604 based on the received location information, and the network objects 604 that are displayed may be filtered based on the zoom level of map 602.

System

Figure 7:
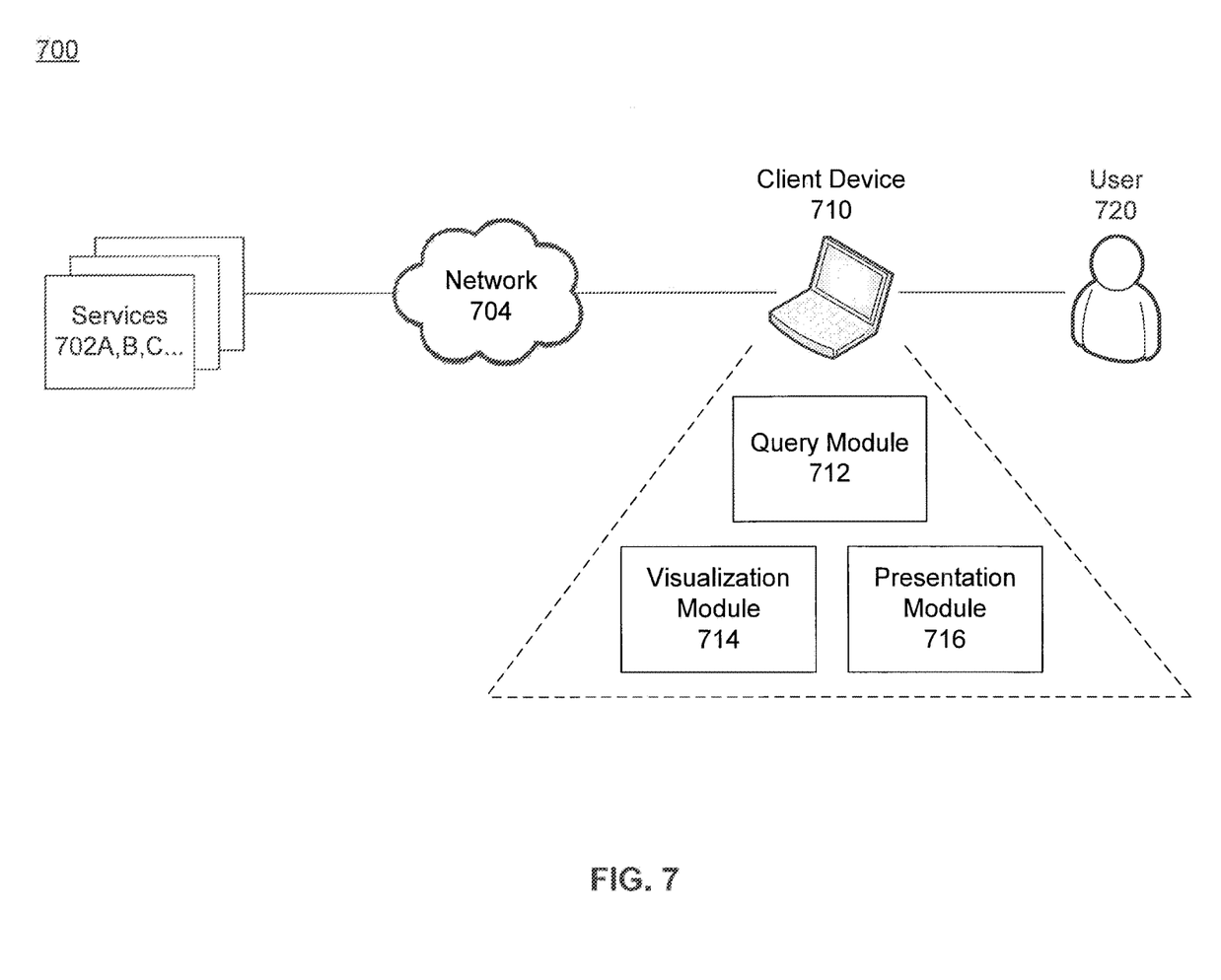
FIG. 7 is a diagram illustrating an example system for providing visualization of a telecommunications network topology, according to an embodiment.

FIG. 7 is a diagram illustrating an example system for providing visualization of a telecommunications network topology, according to an embodiment. System 700 includes a client device 710 connected to one or more services 702 by one or more networks 704, such as the Internet. Client device 710 may be operated by a user 720.

Client device 710 may, for example, include a web browser that enables user 720 to interact with the graphical user interface described with respect to FIGS. 1-6. The web browser can respond to user input to send an HTTP request to one the plurality of services 702A, B, C . . . via network 704. In another example, user 720 may interface with client 710 through a native application instead of a web browser, such that the native application communications with the plurality of services 702A, B, C . . . . Client 710 may be any type of computing system, such as and without limitation, a PC, laptop, or mobile device.

Client device 710 may operate as described with respect to FIGS. 1-6. In the embodiment of FIG. 7, client device 710 includes three modules: query module 712, visualization module 714, and presentation module 716.

Query module 712 is responsible for all communication between client device 710 and the plurality services 702A, B, C . . . . As described above, query module 712 may send requests to a service 702 and receive a response containing one or more data objects. The data objects may be structured using a standard text format, such as JSON or XML, so that only minimal data is exchanged between client device 710 and the plurality of services 702A, B, C . . . . Response data received by query module 712 may be distributed to visualization module 714 and presentation module 716 for further processing and display.

Visualization module 714 is responsible for data processing and the generation of visual representations of network objects at client device 710. As described previously, visualization module 714 contains logic to process data defining the topological structure of network objects in a telecommunications network. Once relevant information is extracted from the data, visualization module 714 may generate visual representations of the topological structure of a plurality of network objects that may be provided to presentation module 716 for use in displaying the visual representations in an interactive user interface.

Presentation module 716 is responsible for rendering and displaying data and objects received from query module 712 and visualization module 714 in the graphical user interface. This includes displaying visual representations of the network and other relevant data in the user interface, as described previously. Presentation module 716 also controls interaction between the user interface and user 720, as described with respect to FIGS. 1-6.

Each of the services, devices, and modules in FIG. 7 may be implemented on the same or different computing systems in hardware, software, or any combination thereof. Such computing systems can include, but are not limited to, a personal computer, a mobile device such as a mobile phone, workstation, embedded system, game console, television, set-top box, or any other computing system. Further, a computing system can include, but is not limited to, a device having a processor and memory, including a nontransitory memory, for executing and storing instructions. The memory may tangibly embody the data and program instructions. Software may include one or more applications and an operating system. Hardware can include, but is not limited to, a processor, memory, and graphical user interface display. The computing system may also have multiple processors and multiple shared or separate memory components. For example, the computing system may be a part of or the entirety of a clustered computing environment or server farm.

Example Computer System

Figure 8:
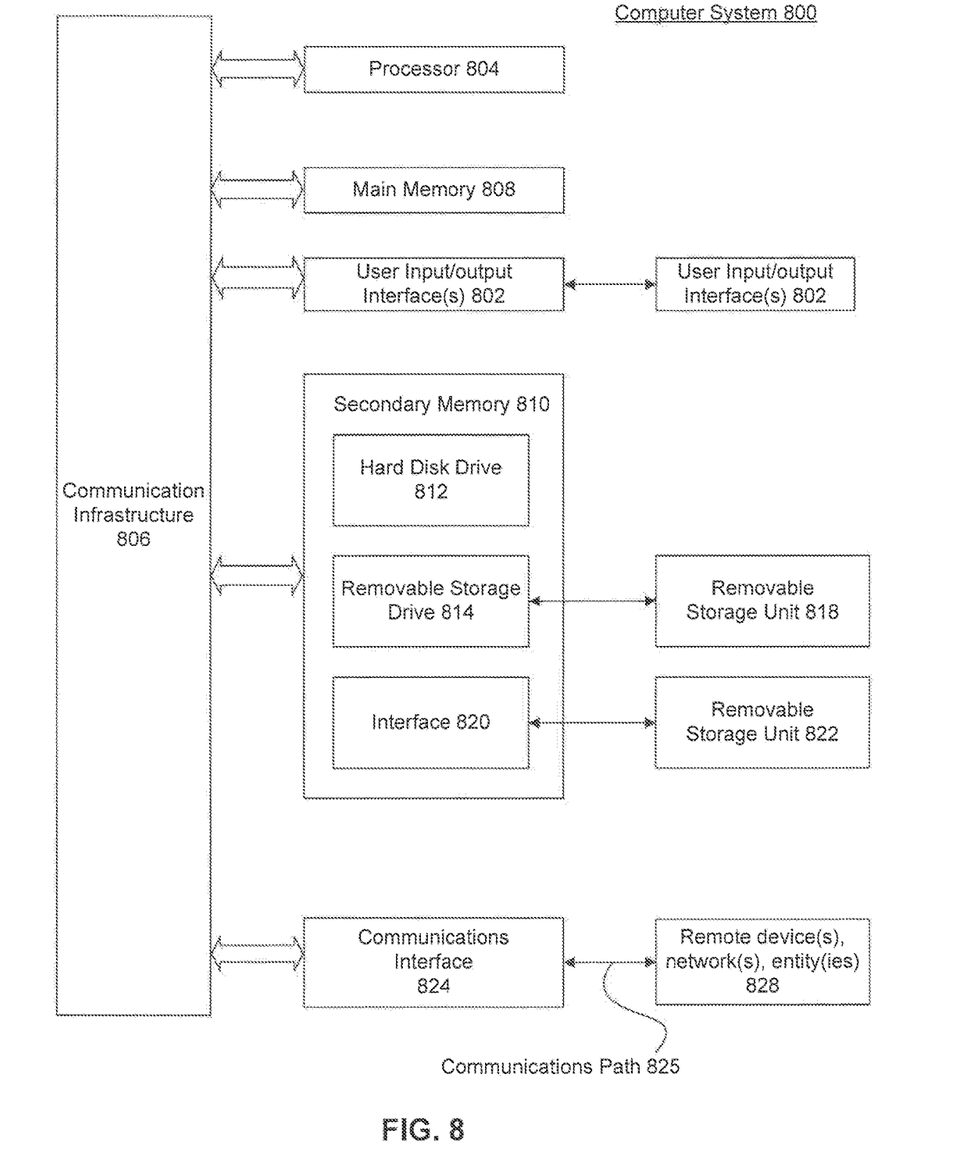
FIG. 8 is a diagram illustrating an example computing device, according to an embodiment.

FIG. 8 is an example computing system useful for implementing various embodiments. Various embodiments can be implemented, for example, using one or more well-known computer systems, such as computer system 800. Computer system 800 can be any well-known computer capable of performing the functions described herein, such as computers available from International Business Machines, Apple, Sun, HP, Dell, Sony, Toshiba, etc.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 8. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments, but should be defined only in accordance with the following claims and their equivalents.

What is claimed is:

1. A method for providing visualization of a telecommunications network topology, comprising:
   displaying a communications path search field in an interactive graphical user interface, wherein a communications path describes a topological structure of network objects in the path of communication between two network objects;
   sending an asynchronous request for data matching a search query based on input received from a user, wherein the asynchronous request enables the request to be sent and processed without blocking interaction with the interactive graphical user interface;
   receiving, at a client device, a response comprising a data object, the data object comprising a plurality of data fields and corresponding field values that describe a plurality of communications paths in the telecommunications network matching the search query;

processing, at the client device, the received data object to generate visual representations of the plurality of communications paths described in the data object, wherein the processing further comprises, for each of the plurality of communications paths described in the data object:

identifying a plurality of network objects contained in the communications path;

generating, for each of the plurality of network objects, a visual representation based at least on a type and a status associated with the network object;

identifying connections between the plurality of network objects to determine a path topology; and arranging the plurality of visual representations based on the path topology to generate a visual representation of the communications path; and displaying, at the client device, the visual representations of the plurality of paths in the interactive graphical user interface.

2. The method of claim 1, further comprising:

sending an initial asynchronous request comprising an initial search query in response to initial input from a user;

receiving, at the client device, a response comprising one or more suggested query options based on the initial search query, each query option targeting a network object or group of network objects in the telecommunications network;

displaying, in the interactive user interface, the one or more query options; and accepting a selection from the user of one of the one or more suggested query options, wherein the search query of the asynchronous request comprises the network object or group of network objects targeted by the selected query option.

3. The method of claim 2, wherein:

the initial input from the user comprises a sequence of characters, a new asynchronous request is sent for each character input by the user, and the displayed suggested query options are automatically updated based on the response received for each successive request.

4. The method of claim 1, wherein the search query is saved for future use.

5. The method of claim 1, wherein search query history is recalled.

6. The method of claim 1, wherein:

the asynchronous request is sent via a call to an application programming interface of a service, the service being located on a device separate from the client device, and the response is received from the service.

7. The method of claim 1, further comprising:

retrieving, for each of the plurality of communications paths described in the data object, a confidence level associated with the path; and displaying, in the interactive graphical user interface, the confidence level together with the visual representation of the associated path.

8. The method of claim 1, wherein the processing further comprises:

identifying an existing network fault related to one or more of the plurality of communications paths described in the data object; and incorporating the identified network fault into the generated visual representations of the one or more related communications paths.

9. The method of claim 8, wherein the network fault is assigned a severity level, and wherein the severity level is displayed in the interactive graphical user interface together with the visual representations of the one or more related communications paths.

10. The method of claim 1, further comprising:

establishing a persistent, bidirectional connection between the client device and a network fault monitoring service;

receiving, at the client device, a notification of a network fault from the network fault monitoring service; and automatically updating the displayed visual representations of communications paths related to the network fault in the interactive graphical user interface based on the received notification.

11. The method of claim 1, wherein the processing further comprises, for each communications path described in the received data object:

for each network object in the path, determining whether sufficient data is available in the data object to generate a visual representation of the network object;

for each network object in the path, in the event that sufficient information is available, generating a visual representation of the network object as part of the visual representation of the communications path; and in the event that sufficient information is not available for at least one network object in the path, generating at least one generic visual as part of the visual representation of the communications path indicating that there is insufficient information to generate a visual representation of a portion of the communications path.

12. The method of claim 11, wherein the processing further comprises, for each communications path defined described in the received data object:

in the event that sufficient information is not available for at least one network object in the communications path, displaying insufficiency details in the interactive user interface together with the visual representation of the communications path.

13. The method of claim 1, further comprising:

sending a request for data related to network objects in the telecommunications network located in a particular geographic region;

receiving, at the client device, a response comprising a data object, the data object comprising location information for network objects located in the geographic region;

displaying, at the client device, the network objects on an interactive map interface within the interactive graphical user interface based on the corresponding location information, wherein the network objects displayed are filtered based on a zoom level associated with the interactive map interface.

14. The method of claim 13, wherein the network objects displayed on the interactive map interface are updated as the zoom level is adjusted, such that more granular network objects are visible at higher zoom levels.

15. The method of claim 1, further comprising:

receiving, at the client device, status information for a plurality of network objects in the telecommunications network, wherein the status information comprises information related to existing network faults;

aggregating, at the client device, the received status information; and displaying, in the interactive graphical user interface, the aggregated status information.

16. The method of claim 15, further comprising:
creating a list of the existing network faults based on the received status information;
displaying, in the interactive graphical user interface, the list of existing network faults;
accepting a selection from the user of one of the network faults in the list; and
displaying visual representations of communications paths in the telecommunications network related to the selected network fault.

17. The method of claim 1, wherein the telecommunications network comprises at least 5 network sites and 100 distinct network objects.

18. The method of claim 1, wherein the data fields of the data object are collectively able to describe a communications path between any two network objects in the telecommunications network.

19. A system for providing visualization of a telecommunications network topology, comprising:
a client computing device;
a presentation module, implemented on the client computing device, configured to display a communications path search field in an interactive graphical user interface, wherein a communications path describes a topological structure of network objects in the path of communication between two network objects;
a query module, implemented on the client computing device, configured to:
send an asynchronous request for data matching a search query based on input received from a user, wherein the asynchronous request enables the request to be sent and processed without blocking interaction with the interactive graphical user interface; and
receive a response comprising a data object, the data object comprising a plurality of data fields and corresponding field values that describe a plurality of communications paths in the telecommunications network matching the search query;
a visualization module, implemented on the client computing device, configured to process the received data object to generate visual representations of the plurality of communications paths described in the data object, wherein the visualization module is further configured to, for each of the plurality of communications paths described in the data object:
identify a plurality of network objects contained in the communications path;
generate, for each of the plurality of network objects, a visual representation based at least on a type and status associated with the network object;
identify connections between the plurality of network objects to determine a path topology; and
arrange the plurality of visual representations based on the path topology to generate a visual representation of the communications path; and
a presentation module, implemented on the client computing device, that displays the visual representations of the plurality of paths in the interactive graphical user interface.

20. The system of claim 19, further comprising:
a plurality of services,
wherein the query module is further configured to (i) send a request via a call to an application programming interface of one of the plurality of services, the one of the plurality of services being located on a device separate from the client device, and (ii) receive a response from the one of the plurality of services.

21. The system of claim 19, further comprising:
a network fault monitoring service,
wherein the query module is further configured to (i) establish a persistent, bidirectional connection between the client device and the network fault monitoring service, and (ii) receive a notification of a network fault from the network fault monitoring service,
wherein the visualization module is further configured to regenerate the visual representations of communications paths related to the network fault based on the received notification, and
wherein the presentation module is further configured to automatically update the displayed visual representations in the interactive graphical user interface based on the regenerated visual representations.

22. The system of claim 19, wherein the telecommunications network comprises at least 5 network sites and 100 distinct network objects.

23. The system of claim 19, wherein the data fields of the data object are collectively able to describe a communications path between any two network objects in the telecommunications network.

* * * * *